UNITED STATES PATENT OFFICE.

ISRAEL R. BLUMENBERG, OF WASHINGTON, DISTRICT OF COLUMBIA.

INDESTRUCTIBLE COMPOUND FOR LINING AND COATING TUBES, CYLINDERS, AND OTHER VESSELS, ELECTRIC WIRES, ALSO FOR JOINT-PACKING, TAKING IMPRESSIONS, MAKING CASTINGS, MOLDS, AND ORNAMENTS, AND ORNAMENTAL WORK.

SPECIFICATION forming part of Letters Patent No. 275,123, dated April 3, 1883.

Application filed February 7, 1883. (No specimens.)

*To all whom it may concern:*

Be it known that I, ISRAEL R. BLUMENBERG, a citizen of the United States, residing at Washington, in the District of Columbia, have invented certain new and useful Improvements in an Indestructible Compound for Lining and Coating Tubes, Cylinders, and other Vessels, Electric Wires, also for Joint-Packing, Taking Impressions, Making Castings, Molds, and for Ornaments and Ornamental Work, of which the following is a specification, reference being had therein to the accompanying drawings.

My invention relates to, and thereby I desire, by incorporating together the ingredients hereinafter named, to produce a new, useful, indestructible, and an electrical non-conductor compound adapted to numerous purposes; and it consists in compounding together, in the proportion and manner hereinafter specified, lamp-black, asbestus, litharge, and glycerine, as well as in the method of employing the said compound when so prepared.

I have heretofore discovered, and had secured to myself by Letters Patent No. 230,996, dated August 10, A. D. 1880, a compound composed of litharge and glycerine, intended simply as a joint-packing, on which my present invention is an improvement; and among the many uses to which my new compound may be applied to great advantage are, as an interior coating or lining to pipes, cylinders, tubes, and superheaters to protect them from the deleterious effect or action of acids, vapor, fluid, volatile liquids, superheated steam, and the acid thereby generated, and other matters; as a coating for and protection to telegraph-wires and other metals exposed to moisture, damps, atmospheric influences, and many of the elements; as a lining and coating for pipes and tubes in which to lay underground telegraph wires; as a coating for and to preserve metal and render it a non-conductor of electricity and electrical currents; as a packing for joints and a lining for vessels to confine subtile vapors, fluids, and gases; as a medium in or on which to take impressions for making molds, taking casts, making castings, casting ornaments, and for ornaments and ornamental work, &c.

In preparing my compound I take of lamp-black about four per cent.; asbestus, finely pulverized, about twenty per cent.; litharge, finely pulverized, about forty-five per cent.; glycerine, about thirty-one per cent.; total, one hundred per cent., observing merely approximately the proportions here given, remembering that the quantity of glycerine to be employed is to be regulated by the use to which the compound is to be applied, varying according to the consistency required for the purpose, as hereinafter shown. Having first thoroughly pulverized the asbestus and litharge, I add the lamp-black (selecting the better quality) and thoroughly mix together, and then, when I am ready to apply the compound, I add glycerine until I have formed a solution of the consistency required—that is to say, about the consistency of soft dough for taking impressions, making casts, making molds, and doing that character of work; about the consistency of heavy molasses when required for making castings and ornaments, coating metals and wires, and when used as a joint-packing and all work of that character; and of about the consistency of heavy crude oil when desired as an interior coating for pipes, vessels, superheaters, and in matters of that kind. Having thus prepared my compound, it is ready for use.

It will be observed that my compound is of great density and firmness; and it will readily be understood that when it hardens it will be perfectly impervious to acid, gases, vapors, damp, or other extraneous influences.

It will not be amiss to say, right here, that numerous and protracted tests have abundantly demonstrated that sulphuric acid of a density of .75 has no effect upon my compound, and the same may be said of tests of heat and wet. Dry heat of 300° and wet heat without regard to degrees have no effect upon the texture or fiber of my compound, so that I can say, without fear of controversy, that my compound is impervious to gas, vapor, damp, heat, electric currents, and the influences of acid.

It is a well-known and recognized fact among steam-engineers, particularly in sea-going vessels, that the destruction of the superheaters of steam-boilers by the action of acids generated therein leads to many and often serious embarrassments, and that many attempts have been made to overcome this embarrassment. It is no less a fact that metal and other pipes, tubes, and cylinders have been prematurely destroyed or rendered useless by the action of acids or fluids upon them, or by the subtile vapors and gases permeating and escaping therefrom. It is my purpose to overcome these embarrassments and remedy these defects by lining the article or vessel within which such gases, vapors, or fluids are confined or generated, or the steam superheated, &c., with a thin coating of my compound; and for this purpose I bring it to about the consistency of heavy crude oil, that it may flow freely but slowly, so that when poured into or otherwise properly applied to the parts to be lined it will naturally spread to a thin plating or coat, which immediately sets in a closely-adhering lining that soon becomes hard, thus covering the entire surface with a closely-knit, polished, hard, impervious facing, like glass, and, being a mineral compound, it will expand and contract with the metal on which it is used, so that there will be no cracking, checking, or scaling off.

No compound can be better adapted to making ornaments and for ornamental purposes, as in setting it takes on a close, fine, highly-polished surface, which also makes it valuable for use in making molds, &c., and as a joint-packing it is fully equal to that covered by my former patent.

As an article of commerce my compound can be put up in hermetically-sealed vessels; but the better course would be to put it up as a dry powder, to which the glycerine may subsequently be added when it is used, as it is the better way to prepare it as it is required for use.

Having now fully set forth the mode of making and using my compound, I claim—

1. Lamp-black and asbestus, in combination with litharge and glycerine in a compound for lining and coating pipes, cylinders, and vessels, and for other purposes, substantially as described.

2. The combination of asbestus, lamp-black, litharge, and glycerine in a compound for lining and coating pipes, tubes, cylinders, vessels, and for other purposes, substantially as described.

3. In combination, litharge, glycerine, asbestus, and lamp-black commingled together into one compound to be used as a joint-packing, a lining and coating for cylinders, tubes, pipes, vessels, and for other purposes, substantially as described.

4. A compound of lamp-black, litharge, asbestus, and glycerine, when prepared and used substantially as described.

5. A compound consisting of lamp-black, litharge, asbestus, and glycerine, for taking impressions, making molds, making ornaments and ornamental work, lining and coating pipes, cylinders, and other vessels, and as a joint-packing, substantially as described.

In testimony whereof I hereunto affix my signature in presence of two witnesses.

ISRAEL R. BLUMENBERG.

Witnesses:
 A. P. RUTHERFORD,
 H. B. RUTHERFORD.